United States Patent [19]

Blatter

[11] 3,773,615

[45] Nov. 20, 1973

[54] IRRADIATION SURVEILLANCE CAPSULE ASSEMBLIES FOR NUCLEAR REACTORS

[75] Inventor: Albert J. Blatter, Bloomfield, Conn.

[73] Assignee: Combustion Engineering, Inc., Windsor, Conn.

[22] Filed: Apr. 21, 1971

[21] Appl. No.: 136,010

Related U.S. Application Data

[63] Continuation-in-part of Ser. No. 831,078, June 6, 1969, abandoned.

[52] U.S. Cl.................. 176/15, 176/17, 176/74, 176/79, 220/4 C, 220/23.83
[51] Int. Cl............................................. G21g 1/00
[58] Field of Search ................... 176/76, 78, 73, 74, 176/39, 68, 75, 81, 79, 15, 17; 220/23.4, 23.83

[56] References Cited
UNITED STATES PATENTS

| | | | |
|---|---|---|---|
| 3,285,458 | 11/1966 | Wojciechowski........................ | 220/4 |
| 3,274,067 | 9/1966 | Greebler et al.................... | 176/74 X |
| 3,340,154 | 9/1967 | Sinclair et al..................... | 176/79 X |
| 3,287,230 | 11/1966 | Jenkins et al.......................... | 176/78 |
| 3,010,598 | 11/1961 | Fosi ........................................ | 220/4 |
| 3,265,254 | 8/1966 | Carter et al..................... | 222/386.5 |
| 3,086,935 | 4/1963 | Groh et al............................. | 176/75 |

*Primary Examiner*—Harvey E. Behrend
*Attorney*—Eldon H. Luther, Robert L. Olson, John F. Carney, Richard H. Berneike and Stephen A. Schneeberger

[57] ABSTRACT

In an improved irradiation surveillance capsule assembly for nuclear reactors, means for positioning and coupling together a plurality of specimen compartments of the irradiation surveillance capsule assembly Each capsule assembly has, in a train-type arrangement, a series of specimen compartments having wedge-shaped end caps which mate with complementary shaped end caps on adjacent compartments. The mating end caps are coupled together for limited relative movement so as to permit transverse off-setting of the specimen compartments upon the application of a longitudinal force whereby the movement will cause the compartments to become wedged against the sides of rectangular irradiation surveillance capsule assembly holders positioned within the reactor so as to eliminate vibration in the specimen compartment train of the capsule assembly.

8 Claims, 7 Drawing Figures

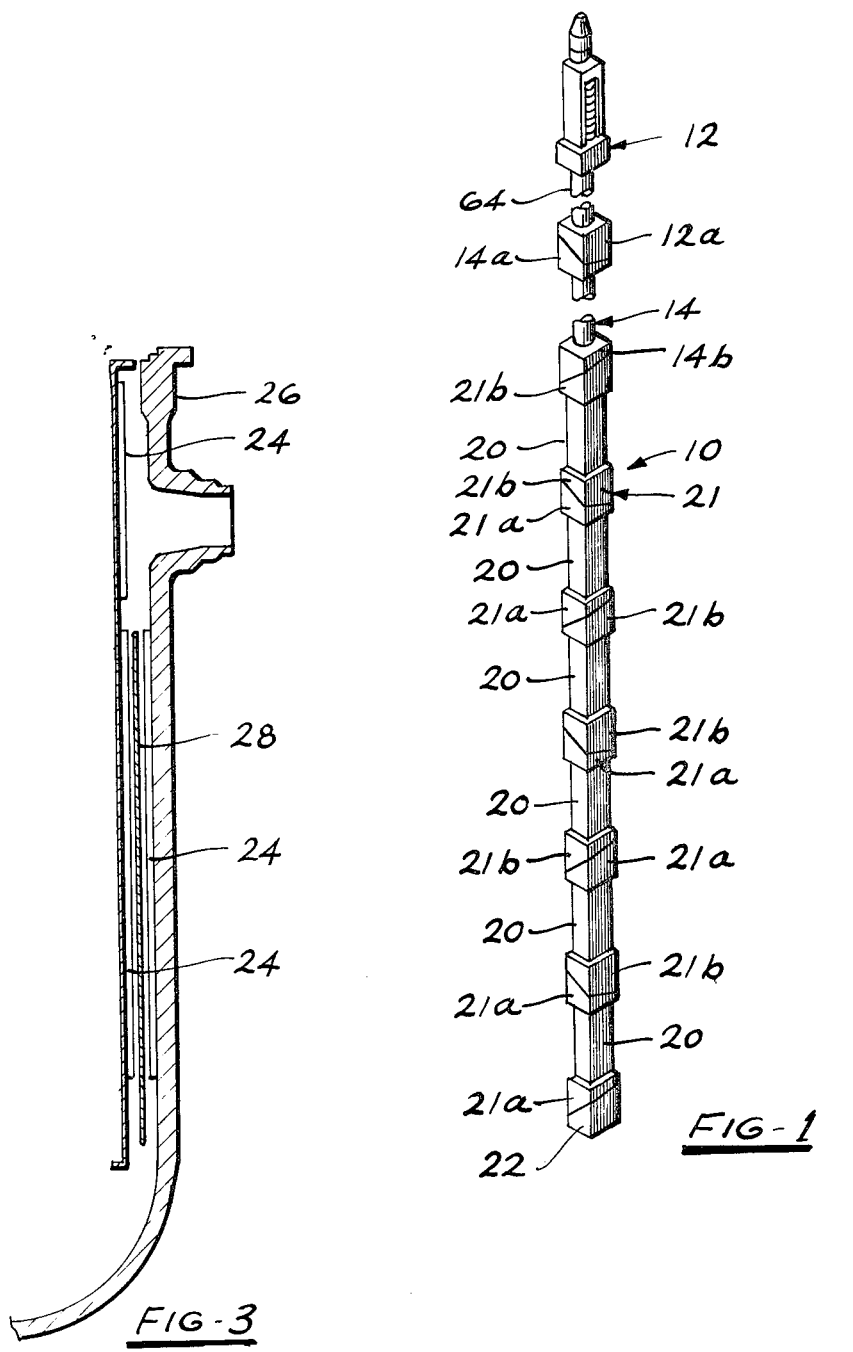

PATENTED NOV 20 1973 3,773,615

INVENTOR.
ALBERT J. BLATTER
BY Lawrence P. Kessin

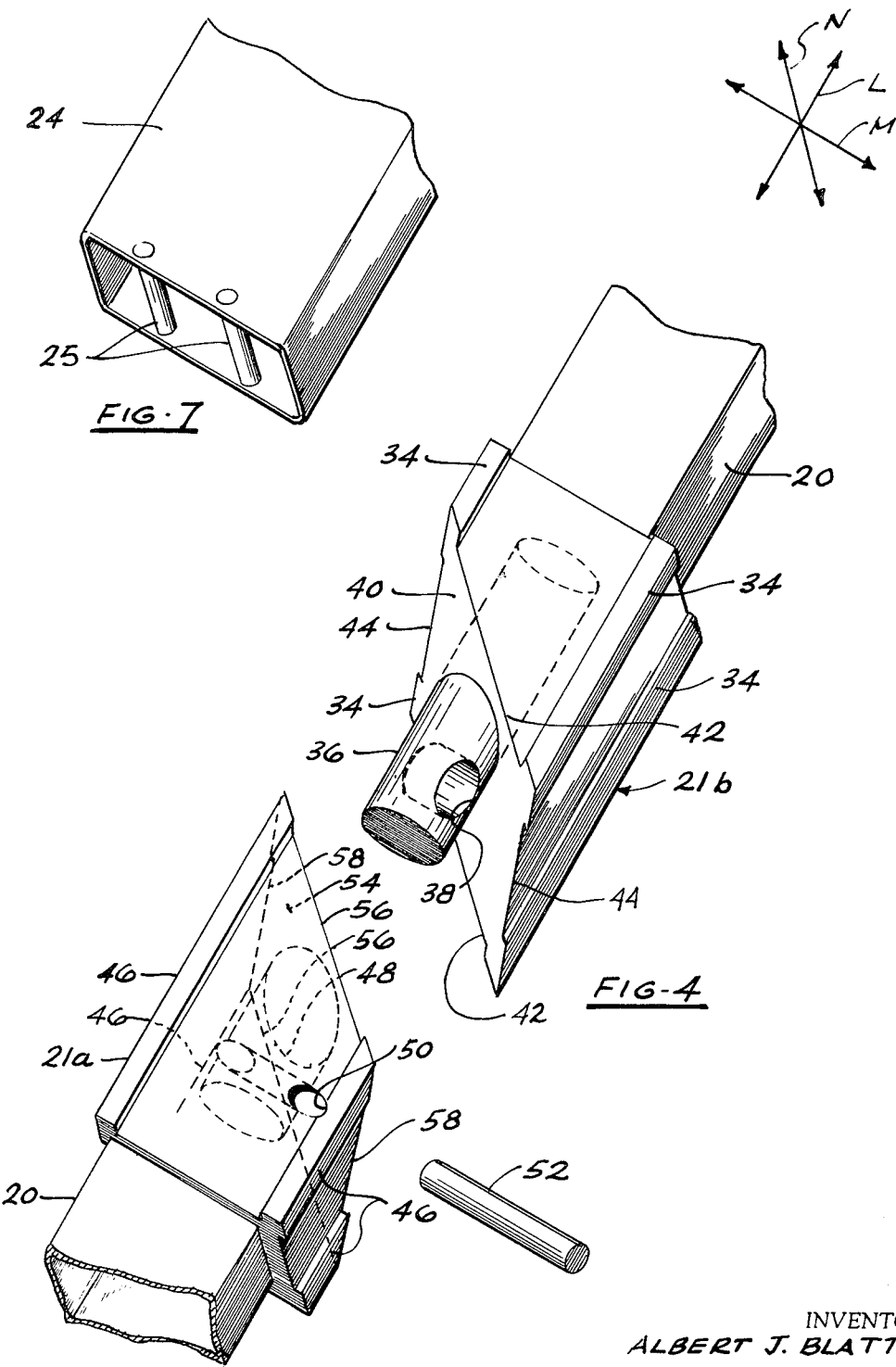

IRRADIATION SURVEILLANCE CAPSULE ASSEMBLIES FOR NUCLEAR REACTORS

This is a continuation-in-part application of application Ser. No. 831,078, filed June 6, 1969, now abandoned.

BACKGROUND OF THE INVENTION

High safety standards are necessarily maintained in the construction and operation of nuclear reactor facilities in order to ensure against the escape of radioactive material in case of a malfunction. Due to the unusual effects of irradiation on certain materials it is necessary, in addition to the standard operation safeguards, to maintain a check of the integrity of the actual reactor structure to ensure its soundness and reliability. In order to accomplish this necessary supervision, samples of particular reactor structural material are placed within the reactor to be irradiated therein during the normal operation thereof. At predetermined intervals, the samples are withdrawn and tested to determine radiation induced changes in the mechanical and impact properties of the materials. By conducting such determinations periodically, the continuing servicability of the reactor structure can be verified.

In the known methods for sample irradiaiton, the particular samples are merely loosely placed in chambers or containers located within the reactor. This arrangement has led to difficulties in that the loosely contained samples may be subjected to damaging vibrations while undergoing irradiation which could possibly yield inaccurate information on the effects induced by the irradiation. Moreover, the vibrations may destroy the samples so that no testing can be accomplished or may even cause them to escape from their containment chambers whereby damage may be caused to the reactor internals.

SUMMARY OF THE INVENTION

In order to facilitate removal of the irradiation surveillance capsule assemblies from the reactor after a determined amount of irradiation and to prevent vibrations from damaging the assemblies during their stay within the reactor, the instant invention was devised for positioning and coupling together the train arrangement of individual specimen compartments which form each irradiation surveillance capsule assembly. On each end of the specimen compartments which make up the irradiaition surveillance capsule assembly are wedge-shaped end caps of such configuration that adjacent end caps have a complementary mating relationship. The mating end caps are coupled together for limited relative movement so as to permit transverse offsetting of adjacent specimen compartments upon the application of a longitudinal force through a locking assembly to wedge the compartments against the sides of rectangular irradiation surveillance capsule assembly containers or holders particularly positioned within the reactor. The location of the holders within the reactor is determined so as to give an accurate picture of irradiation effects on structural reactor material by subjecting the specimens within the irradiation surveillance capsule assemblies to a neutron flux, flux spectra, and temperature history such as that actually experienced by the particular reactor vessel material. The locking assemblies serve as a point of attachement for a tool for removing the irradiated capsule assemblies as well as providing the longitudinal force for eliminating vibration in the capsule assemblies by the wedging action induced thereby.

BRIEF DESCRIPTION OF THE DRAWINGS

FIG. 1 is a perspective view of an irradiation surveillance capsule assembly embodying the principles of this invention.

FIG. 3 is a view partly in section of the reactor vessel taken generally along the line 3—3 of FIG. 2.

FIG. 4 is an exploded isometric view of adjacent mating specimen compartment end caps according to this invention.

FIG. 7 is an isometric view of the bottom opening of an irradiation surveillance capsule assembly holder.

DETAILED DESCRIPTION

Figure 6:
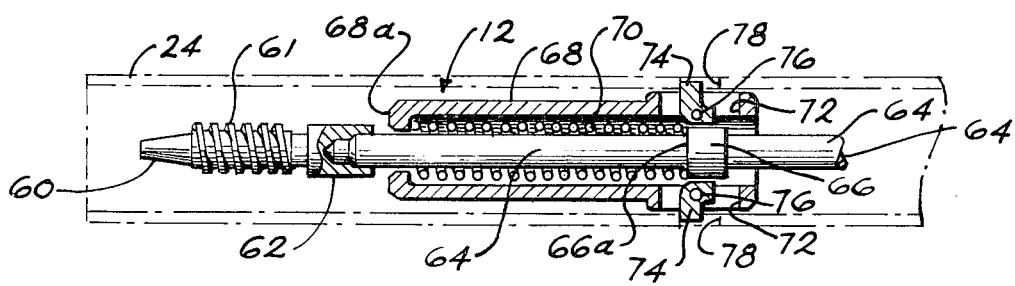
FIG. 6 is a view partly in section of the locking assembly according to this invention.

Referring now to FIG. 1, numeral 10 designates an irradiation surveillance capsule assembly, embodying the principles of this invention, which comprises a locking assembly 12, an extension section 14 and a series of specimen compartments 20. The compartments contain specimens for testing the effects of irradiation such as by tensile monitoring tests of Charpy impact tests. The tensile specimens are from various portions of the reactor structure including weld metal test areas, base metal test areas, and heat affected zone test areas. The Charpy impact specimens are similarly of materials from weld areas, base metal areas and heat affected zone areas. The number of compartments which contain a particular type of specimen and the particular orientation of the different compartments in the capsule assembly are a matter of choice or design according to the particular testing necessities required for determining structural integrity for each individual reactor faciity material.

Each specimen compartment 20 is a hollow tube of rectangular cross section having wedge-shaped end caps 21 removably located at each end of the compartment to form a closed receptical within which the previously mentioned specimens are positioned. Adjacent caps such as 21a and 21b between two adjacent compartments 20 are complementary shaped so that a uniform vertical train will be formed. The extension section 14, which may be of varying lengths so as to permit regulation of the overall length of the surveillance capsule assembly 10, has end caps 14a and 14b which mate with end cap 12a of the locking assembly 12 and uppermost end cap 21a, respectively. Completing the capsule assembly is a bottom end cap 22.

Figure 2:
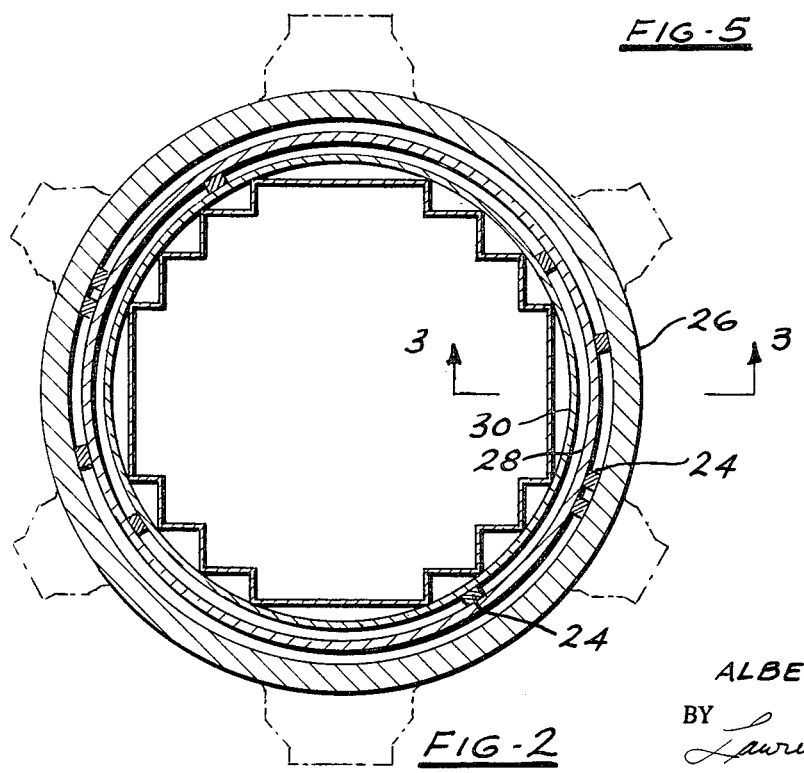
FIG. 2 is a plan sectional view of a reactor vessel showing the location of the irradiation surveillance capsule assembly holders.

The irradiation surveillance capsule assemblies, such as assembly 10 are placed in containment means such as rectangular holders 24 which are located within a nuclear reactor. The holders 24 are rectangular tubes having open tops and bottoms to permit flow therethrough aand having bottom rod supports 25 (FIG. 7) for supporting assemblies 10. The holders 24 are located in the reactor as an illustrative example, as shown in FIGS. 2 and 3. The positioning of these holders is determined so as to subject the specimens within the capsule assemblies 10 to representative irradiation conditions (i.e., neutron flux, flux spectra, temperature history) to which the reactor vessel is subjected. In this manner it is possible to assess the changes in the nil-ductile transition temperature (NDTT — the theoretical temperature at which there is a change between ductile and brittle workability of a particular material) and mechanical properties of the reactor vessel materials as a function of neutron irradiation. The results from the data received may be used to verify vessel structure integrity and thus influence the operating parameters of the particular reactor during its design lifetime. In the particular reactor vessel 26 (FIGS. 2 and 3) the rectangular holders 24 are located about the inside diameter of the vessel wall as well as between the thermal shield 28 and the core barrel support 30, the latter being irradiated at an accelerated exposure rate for early testing of probable long-range effects. Additional capsule assemblies may be positioned above the core level (e.g., opposie flow nozzle of FIG. 3) so as to be subject primarily to and give information on the thermal effects within the reactor.

Figure 5:
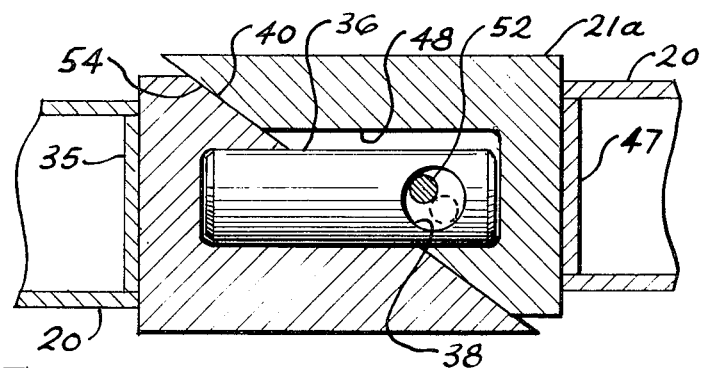
FIG. 5 is a view partly in section of two adjacent speciment compartment end caps in their mated laterally off-set postion.

In order to properly position and maintain irradiation capsule assemblies 10 within their respective rectangular holders 24, special wedge-shaped end caps 21 (21a, 21b) for the specimen compartments are provided according to this invention. The particular structure of these end caps 21 is best seen in FIGS. 4 and 5 which represent the junction of adjacent specimen compartments in the surveillance capsule assembly 10. The wedge-shaped end cap 21b is in the form of a rectangular block having extending end portions 34 (the extending edge portions permit coolant flow along the specimen compartment train to protect against γ-heating) and a projection 35 to retain the end cap 21b within the compartment 20. A male member 36 is retained within and extends from the end cap 21b along the longitudinal axis L thereof (FIG. 5). The male member 36 has a transverse bore 38 therethrough for the purpose to be explained hereinbelow. The rectangular block of the end cap 21b terminates in a mating surface face 40 which is described by a plane bounded by parallel edges 42, in the direction of the major dimension axis M (FIG. 4), and parallel edges 44 along the minor dimension axis N. The parallel edges 42 are oriented so that the plane therethrough angularly intersects the longitudinal axis L and the major dimension axis M, while the parallel edges 44 are oriented so that the plane therethrough angularly intersects the longitudinal axis L and the minor dimension axis N. The resulting surface 40 therefore may be described as a plane angularly intersecting each of the three principle axes of the end cap 21b.

Mating with the end cap 21b is the end cap 21a of the adjacent specimen compartment 20, this end cap also being in the shape of a rectangular block having extending edges 46 and a projection 47 for the same purposes as edges 34 and projection 35 of end cap 21b. A bore 48 is provided along the longitudinal axis of the end cap 21a, this bore being of a diameter slightly larger than the diameter of the male member 36 of the end cap 21b. A second bore 50 is located transversely of the longitudinal bore 48 and provides a passage for the dowel 52, the dowel 52 upon assembly of the mating end caps 21b and 21a passing freely through the transverse bore 38 of the male member 36 (FIG. 5). The rectangular block of end cap 21a terminates in a mating surface face 54 which is described by a plane bounded by parallel edges 56, in the direction of the major dimension axis M, and parallel edges 58 in the direction of the minor dimension axis N. The parallel edges 56 are oriented so that the plane therethrough angularly intersects the longitudinal axis L and the major dimension axis M, while the parallel edges 58 are oriented so that the plane therethrough angularly intersects the longitudinal axis L and the minor dimension axis N. The resulting surface 54 therefore may be described as a plane angularly intersecting each of the three principle axes of the end cap 21a.

It can thus be seen that upon the mating of the adjacent end caps 21b and 21a the male member 36 will be loosely confined within the longitudinal bore 48 and retained therein when dowel 52 is inserted through the bore 50 and the transverse bore 38 of the male member 36. The mating surface faces 40 and 54 are angularly complementary with respect to the surveillance capsule assembly so that in their mating the end caps 21b and 21a will have a permitted lateral off-set movement in the direction of the major dimension axis M and the minor dimension axis N upon a given movement along the longitudinal axis L. As shown, end caps 21b will move in a direction toward the right in FIGS. 1 and 4, while end caps 21a will move in a direction toward the left thus off-setting adjacent specimen compartments 20 while maintaining the longitudinal axes thereof in a parallel relationship. The lateral off-set of the end caps 21 serves to lock the specimen compartment train 10 within the rectangular holders 24 by a wedging action of the end caps against the interior of the holders. This is to say, the plane of movement of the end caps 21, determined by the mating surfaces 40 and 54, is such that upon a longitudinal force one end cap 21b will be forced against intersecting interior walls of the particular rectantular holder 24 while the mating end cap 21a will be forced against opposite intersecting walls of the holder.

The desired longitudinal movement which causes the locking or wedging function to occur is initiated by the locking assembly 12 shown in detail in FIG. 6. A tool-engaging end 60 is provided with ACME threads 61. This end is coupled through a coupling 62 to a shaft 64 having a collar 66 thereon intermediate its length and connected at its opposite end to the locking assembly end cap 12a (same configuration as wedge end cap 21b). Surrounding the upper portion of the shaft 64 and the collar 66 is a housing 68. A spring 70 is located within the housing 68 and seats on the shoulder 66a of the collar 66. The housing 68 has apertures 72 through which latch members 74 protrude. The latch members 74 are pivotably mounted on the housing 68 in the apertures 72 by means of pins 76. The latch members 74 extend outside the housing 68 a sufficient distance to engage openings 78 in the rectangular holder 24 to lock the assemblies 10 in their respective holders 24 as explained hereinbelow.

The operation of this invention is as follows. Specimen compartments 20 are loaded with test specimen and the wedge-shaped end caps 21 are affixed thereto. A train of the specimen compartments 20 is arranged by mating end caps 21a, 21b of adjacent compartments so as to interlock the male member 36 within the longitudinal bore 48 by the pin 52, as described above. A bottom end cap 22 is similarly attached to the end cap of the lowermost specimen compartment. Extension section 14 is attached to the end cap 21b of the uppermost compartment 20 by means of the interlocking relationship between the complementary shaped end cap 14b (same configuration as wedge end cap 21a ) and the end cap 21b. The extension section 14 is in turn attached to the locking assembly 12 through the interlocking relationship between the complementary shaped extension section end cap 14a (same configuration as wedge end cap 21a ) and the locking assembly end cap 12a connected to the shaft 64. The length of the extension section 14 is dependent upon the overall length of the specimen compartment train so that the respective locking assemblies 12 of each of the plurality of irradiation surveillance capsule assemblies to be placed in the reactor will be at the same relative height to facilitate removal of the capsule assemblies from the reactor.

The positioning of a surveillance capsule assembly 10 within its respective rectangular holder 24 is accomplished in the following manner. During initial reactor construction and before the core and the coolant are admitted thereto, each assembly 10 is manually inserted within its respective particularly positioned rectangular holder 24 to rest on support rods 25. An assembly tool (not shown) having an internal ACME thread corresponding to the threads 61 on tool-engaging end 60 is placed over this tool-engaging end 60 to abut shoulder 68a of housing 68. By rotation of the assembly tool, shaft 64 will be drawn up against the bias of spring 70 and will permit latches 74 to pivot freely about pins 76. These latches are manually pivoted to a retracted or unlocking position within apertures 72 to permit the insertion of the capsule assembly 10 into the holder 24. Once the locking assembly 12 is located adjacent the openings 78 in the rectangular holder 24, the assembly tool will be removed thus allowing the spring 70 to assert a bias on the collar 66 of shaft 64, the collar in turn forcing the latches 74 into the openings 78 and locking them therein.

In the position in which the latches 74 are constrained within the openings 78 in a locking position, the net force of the spring 70 is asserted along shaft 64 to apply, with the overall weight of the capsule assembly 10, a longitudinal force along the axis L of the specimen compartment train against the support rods 25. Due to the interconnection and interrelation of the mating surfaces (40, 54) of the end caps 21a and 21b, this longitudinal force results in the above-noted limited lateral off-set movement of adjacent mating end caps. The off-set results in adjacent specimen compartments 20 being moved in opposite transverse directions (while maintaining the same general longitudinal axis) so that edge portions 34 and 46 of the end caps 21b and 21a are forced against the opposite interior intersecting walls of the rectangular holder 24 to wedge the specimen compartments 20 therein and prevent vibratons from damaging the materials within the compartments.

Removal of the irradiation surveillance capsule assembly 10 from its respective rectangular holder 24 is acomplished by a tool (not shown) similar to the assembly tool used for insertion of the capsule within the holder, but must of necessity be much longer in that removal must be accomplished from a remote point after core loading to avoid exposure of the operator to dangerous radioactivity. This removal tool is inserted over the tool-engaging end 60 to rest on the shoulder 68a of the housing 68. Complementary internal ACME threads mating with threads 61 of the tool-engaging end 60 will result in movement of the shaft 64 against the bias of spring 70 upon rotation of the tool to release the latch members 74 for pivoting about the pins 76 and to release the wedging action of the end caps 21 so as to permit removal of the capsule assembly 10 from the rectangular holder 24.

From the foregoing it is apparent that there is herein provided an improved irradiation surveillance capsule assembly with a novel method and apparatus for maintaining and positioning the assembly within nuclear reactor vessels and facilitating the removal thereof. By providing each specimen compartment of a surveillance capsule assembly with wedge-shaped end caps mating with complementary shaped end caps on adjacent compartments and so defining the mating interfaces thereof to permit relative limited lateral off-set movement upon the application of a force along the longitudinal axis of the compartments, the compartments will wedge against the internal surfaces of the rectangular capsule assembly holders to prevent vibrations, and possible resulting damage, from occurring in the specimen compartment train. The unique locking assembly accomplishes the application of the necessary longitudinal force to result in the off-setting movement of the end caps to lock them in the holder while additionally providing a uniform and convenient means for inserting and removing the respective irradiation surveillance capsule assemblies from the reactor.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. In combination: a longitudinally extending containment means having an interior wall; a plurality of compartments positioned in an end-to-end relationship to form a longitudinally extending train arrangement located within said containment means closely adjacent said interior wall thereof, the ends of adjacent compartments being interconnected and interrelated to produce lateral offset movement therebetween upon the application of a compressive longitudinal force to said compartment train; and means for applying a compressive longitudinal force to said compartment train to cause said lateral offset movement to force the ends of said compartments against said interior wall of said containment means.

2. An irradiation surveillance capsule assembly and holder for a nuclear reactor, said assembly and holder comprising: a longitudinally extending rectangular holder having interior walls for placement in the nuclear reactor; at least two specimen compartments oriented in an end-to-end relationship to form a longitudinal train arrangement, said specimen compartments being supported with said rectangular holder and closely spaced from said interior walls thereof; end caps on the ends of each of said specimen compartments, adjacent end caps having complementary interconnecting means interrelated to produce lateral offset movement therebetween upon application of a compressive longitudinal force; and means for applying a compressive longitudinal force to said specimen compartments to cause cause said lateral offset movement to force said end caps to move to positively engage said interior walls of said rectangular holder to prevent specimen compartment vibration.

3. The apparatus of claim 2 wherein said complementary interconnecting means of said adjacent end caps also produces longitudinal offset movement of said end caps upon the application of a compressive longitudinal force to said specimen compartments.

4. The apparatus of claim 3 wherein said complementary interconnecting means includes mating surface faces which are angularly inclined to the longitudinal axis of said compartment train.

5. The apparatus of claim 4 wherein said complementary interconnecting means further includes a male member extending from one end cap coincident with the longitudinal axis of the respective specimen compartment with which it is associated, said male member having a transverse bore therethrough perpendicularly intersecting said longitudinal axis, said adjacent end cap having a female bore along the longitudinal axis of its respective specimen compartment, said female bore being slightly larger than and receiving said male member, and a pin extending transversely of said female bore and perpendicularly intersecting said longitudinal axis, said pin being smaller than and passing through said transverse bore of said male member for retaining the male member within said female bore upon interconnection thereof.

6. The apparatus of claim 2 wherein said means for applying a longitudinally directed force includes a locking assembly, said locking assembly comprising: a housing, an elongated shaft passing through said housing, said shaft being coupled to the uppermost specimen compartment of said specimen train at one end and having a tool engaging member affixed to the other end, biasing means urging said shaft relative to said housing in a direction along the longitudinal axis of said speciment compartment train to apply said force thereto.

7. The apparatus of claim 6 wherein said locking assembly further includes a releasable latching means mounted on said housing for selectively retaining said housing within said rectangular holder and actuating means on said shaft for actuating said latching means to a locking position when said shaft is urged in a direction along said longitudinal axis of said specimen compartment train toward said train and to an unlocking postion when moved in an opposite direction.

8. The apparatus of claim 7 wherein said releasable latching means includes latches pivotally mounted on said housing and said actuating means includes a collar on said shaft located so as to pivot said latches to said locking position upon said movement of said shaft in said first direction and to permit free movement of said latches to said unlocking position upon said movement of said shaft in said second opposite direction.

* * * * *